No. 721,959. PATENTED MAR. 3, 1903.
G. LEWIS.
KICKING BLOCK FOR HORSES.
APPLICATION FILED OCT. 28, 1902.

NO MODEL.

WITNESSES:
A. N. Bonney.
A. K. Hood.

INVENTOR:
George Lewis,
By his Atty.
Henry W. Williams.

UNITED STATES PATENT OFFICE.

GEORGE LEWIS, OF BEVERLY, MASSACHUSETTS.

KICKING-BLOCK FOR HORSES.

SPECIFICATION forming part of Letters Patent No. 721,959, dated March 3, 1903.

Application filed October 28, 1902. Serial No. 129,116. (No model.)

*To all whom it may concern:*

Be it known that I, GEORGE LEWIS, a subject of the King of Great Britain, residing in Beverly, in the county of Essex and State of Massachusetts, have invented a new and useful Improvement in Kicking-Blocks for Horses, of which the following is a specification.

This is an apparatus intended to be strapped around the horse's leg at the fetlock-joint or ankle for the purpose of preventing the horse from kicking, more especially in the stall or stable.

A common method now in use for preventing a horse from kicking consists of a chain and log. The use of a chain and log, however, is very dangerous, and a valuable horse may be crippled and ruined for life by its employment. When my improved device is properly applied to the horse at the fetlock-joint, if the horse attempts to kick the effect is to place the foot or hoof upon the floor and to practically prevent him from kicking. In a short time a kicking horse gives up the effort and is entirely broken of the habit. The device also prevents the horse from pawing, capping his hocks, bruising his legs, and from in various other ways injuring and disabling himself. It of course prevents him from kicking his stall and endangering the safety of the groom. At the same time the horse can lie down and rise in his stall without difficulty.

The nature of the invention is fully described below and illustrated in the accompanying drawings, in which—

Figure 1:
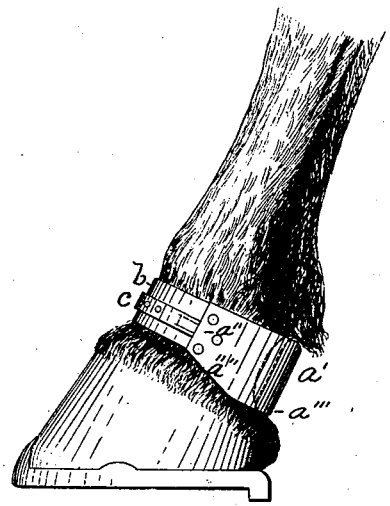
Figure 2:
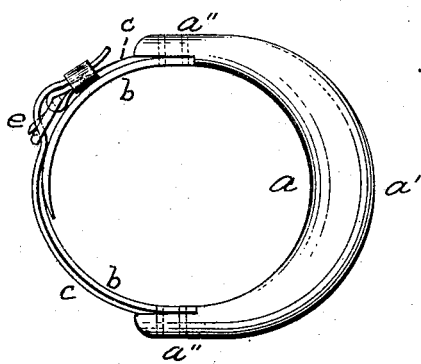
Figure 3:
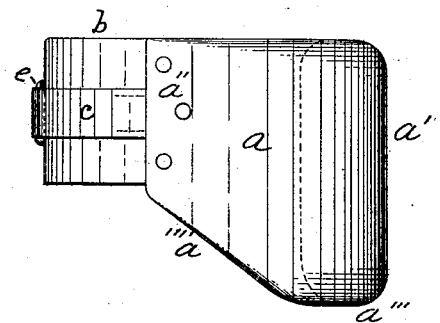
Figure 4:
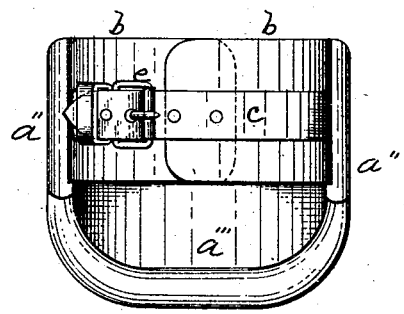

Figure 1 is a side elevation of a portion of a horse's leg with my kicking-block applied in proper position thereon. Fig. 2 is a top view of the same removed. Fig. 3 is a side elevation of the same. Fig. 4 is a front elevation.

Similar letters of reference indicate corresponding parts.

The kicking-block comprises a curved rigid main or block portion open at the front end, flexible overlapping tongues extending inward from the front ends of the main portion, and a securing strap and buckle.

$a$ represents the main portion, curved or U-shaped in horizontal section and with its central portion $a'$ quite thick and the sides gradually growing thinner toward the ends $a''$. This main portion extends downward at the rear or central part and forms an extension $a'''$. The whole of the main portion or block proper is made of wood or other unyielding or rigid material. The front ends $a''$ have secured to them on their inner surfaces overlapping flexible tongues $b$, made, preferably, of leather, and between the tongues and the main portion there is secured to its ends a pair of straps $c$, which are adapted to be fastened by means of an ordinary buckle $e$. The flexible tongues $b$ are narrow as compared with the portion $a'''$ of the block and are no wider than the height of the inner ends $a''$, and the block is preferably beveled up at $a''''$ from its central portion to its ends, as indicated in Fig. 3. Hence when the device is applied to the fetlock-joint or ankle of the horse, as indicated in Fig. 1, while the front of the device is tolerably flexible and narrow the rear is unyielding, wide, and thick. Should the horse endeavor to kick, (and in such an endeavor he necessarily attempts to bend his ankle,) the effect is to bring the foot immediately down upon the floor and kicking is impossible. After a few attempts any horse will give up the effort, and the ultimate effect is to cure the horse of the tendency to kick in a short time.

The device is absolutely harmless, so that the horse cannot injure himself, and the upper and lower edges of the block proper are preferably curved or rounded.

Having thus fully described my invention, what I claim, and desire to secure by Letters Patent, is—

1. The herein-described kicking-block for horses, comprising the rigid, thick, unyielding main portion $a$, the central or rear portion $a'$ of said main portion which is adapted to be placed next the rear side of the ankle being particularly thick and of sufficient length to practically prevent the horse from bending the ankle; and a fastening device attached to the front of said rigid portion and adapted to extend over the front of the leg and secure the block in position, substantially as and for the purpose described.

2. The herein-described kicking-block for horses, comprising the rigid, unyielding, thick main portion $a$, the central or rear portion $a'$ which is adapted to be placed next the rear side of the ankle being particularly thick, sufficiently long to practically prevent the horse from bending the ankle, and being curved or rounded at its upper and lower edges to protect the horse from injury while effectually preventing a kicking movement; and a flexible fastening device attached to the front of the rigid portion and adapted to extend over the front of the leg and secure the block in position, substantially as and for the purpose set forth.

In testimony whereof I have signed my name to this specification in the presence of two subscribing witnesses.

GEORGE LEWIS.

Witnesses:
  HENRY W. WILLIAMS,
  A. N. BONNEY.